US010011293B2

(12) United States Patent
Nagatani et al.

(10) Patent No.: US 10,011,293 B2
(45) Date of Patent: Jul. 3, 2018

(54) STEERING SYSTEM

(71) Applicant: JTEKT CORPORATION, Osaka-shi, Osaka (JP)

(72) Inventors: Atsumune Nagatani, Kashihara (JP); Yu Myohoji, Habikino (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 15/430,822

(22) Filed: Feb. 13, 2017

(65) Prior Publication Data

US 2017/0240199 A1 Aug. 24, 2017

(30) Foreign Application Priority Data

Feb. 19, 2016 (JP) .................................. 2016-030136

(51) Int. Cl.
*B62D 1/184* (2006.01)
*B62D 1/185* (2006.01)
*B62D 1/187* (2006.01)

(52) U.S. Cl.
CPC ............. *B62D 1/184* (2013.01); *B62D 1/185* (2013.01); *B62D 1/187* (2013.01)

(58) Field of Classification Search
CPC ......... B62D 1/184; B62D 1/185; B62D 1/187
See application file for complete search history.

(56) References Cited

U.S. PATENT DOCUMENTS

| 5,009,120 | A * | 4/1991 | Iseler | B62D 1/184 |
| | | | | 280/775 |
| 2009/0044657 | A1 | 2/2009 | Osawa et al. | |
| 2010/0300238 | A1* | 12/2010 | Ridgway | B62D 1/184 |
| | | | | 74/493 |
| 2012/0125139 | A1* | 5/2012 | Tinnin | B62D 1/184 |
| | | | | 74/493 |
| 2013/0118292 | A1 | 5/2013 | Sulser et al. | |
| 2015/0266495 | A1* | 9/2015 | Yoshihara | B62D 1/195 |
| | | | | 74/493 |
| 2015/0266497 | A1* | 9/2015 | Yoshihara | B62D 1/184 |
| | | | | 74/493 |

(Continued)

FOREIGN PATENT DOCUMENTS

| EP | 2 923 920 A2 | 9/2015 |
| JP | 2009-045992 A | 3/2009 |

OTHER PUBLICATIONS

Jun. 20, 2017 Extended European Search Report issued in European Patent Application No. 17155965.1.

*Primary Examiner* — Drew J Brown
(74) *Attorney, Agent, or Firm* — Oliff PLC

(57) ABSTRACT

A steering system enabling telescopic adjustment within a predetermined range includes a second tooth member supported by a lower jacket, a damper fixed to an upper jacket so as to face the second tooth member, and an abutting contact member fixed to the lower jacket and coming into abutting contact with the second tooth member from a side opposite from a side where the damper faces the second tooth member. The damper includes an inclined surface that is located at a portion (an end) of the damper, which faces the second tooth member and that is inclined so as to gradually be closer to the upper jacket toward the second tooth member. During telescopic adjustment, the second tooth member comes into abutting contact with the inclined surface of the damper at a sliding limit position.

6 Claims, 7 Drawing Sheets

(56) References Cited

U.S. PATENT DOCUMENTS

| | | | |
|---|---|---|---|
| 2015/0266499 A1* | 9/2015 | Yoshihara | B62D 1/184 74/493 |
| 2017/0232994 A1* | 8/2017 | Sakuda | B62D 1/184 74/493 |
| 2018/0009463 A1* | 1/2018 | Yoshihara | B62D 1/184 |

* cited by examiner

STEERING SYSTEM

INCORPORATION BY REFERENCE

The disclosure of Japanese Patent Application No. 2016-030136 filed on Feb. 19, 2016 including the specification, drawings and abstract, is incorporated herein by reference in its entirety.

BACKGROUND OF THE INVENTION

1. Field of the Invention

The invention relates to a steering system.

2. Description of the Related Art

In many known steering systems, a tilt adjustment mechanism or a telescopic adjustment mechanism is assembled. The tilt adjustment mechanism adjusts the height and angle of a steering wheel. The telescopic adjustment mechanism adjusts the position of the steering wheel in a front-rear direction. In a conventional telescopic adjustment mechanism, telescopic adjustment is performed by moving a movable bracket installed on a steering column in an axial direction of the steering column with respect to a fixed bracket installed at a predetermined position in an interior of a vehicle. A moving range of the movable bracket during the telescopic adjustment is regulated by abutting contact between stoppers. Thus, when the movable bracket moves to a limit position of the moving range, an impact occurs due to the abutting contact between the stoppers.

A telescopic adjustment mechanism in Japanese Patent Application Publication No. 2009-45992 (JP 2009-45992 A) allows a possible impact to be absorbed. In this mechanism, a stopper buffer material is installed on a fixture provided on a movable bracket, and comes into abutting contact with a collar member supported by a lock shaft that couples the movable bracket to a fixed bracket.

In the telescopic adjustment mechanism in JP 2009-45992 A, if a heavy impact results from the abutting contact between the collar member and the stopper buffer material, the stopper buffer material may come off from the fixture, precluding the impact from being stably absorbed. In another possible configuration, the stopper buffer material is installed on an outer peripheral surface of a steering column. In this case, an impact may make the stopper buffer material likely to come off.

SUMMARY OF THE INVENTION

An object of the invention is to provide a steering system in which a buffer member serving as a stopper is less likely to come off and in which, at the time of abutting contact, a possible impact can be stably absorbed.

A steering system in an aspect of the invention includes a tubular upper jacket to which a steering member is connected at a first end of the upper jacket and a lower jacket slidably fitted to a second end of the upper jacket. The steering system enables telescopic adjustment within a predetermined range. The steering system includes an engaging member supported by the lower jacket, a buffer member fixed to the upper jacket so as to face the engaging member, and an abutting contact member fixed to the lower jacket and coming into abutting contact with the engaging member from a side opposite from a side where the buffer member faces the engaging member. The buffer member includes an inclined surface that is located at a portion of the buffer member, which faces the engaging member, and that is inclined so as to gradually be closer to the upper jacket toward the engaging member. During telescopic adjustment, the engaging member comes into abutting contact with the inclined surface of the buffer member at a siding limit position.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENT

Figure 1:
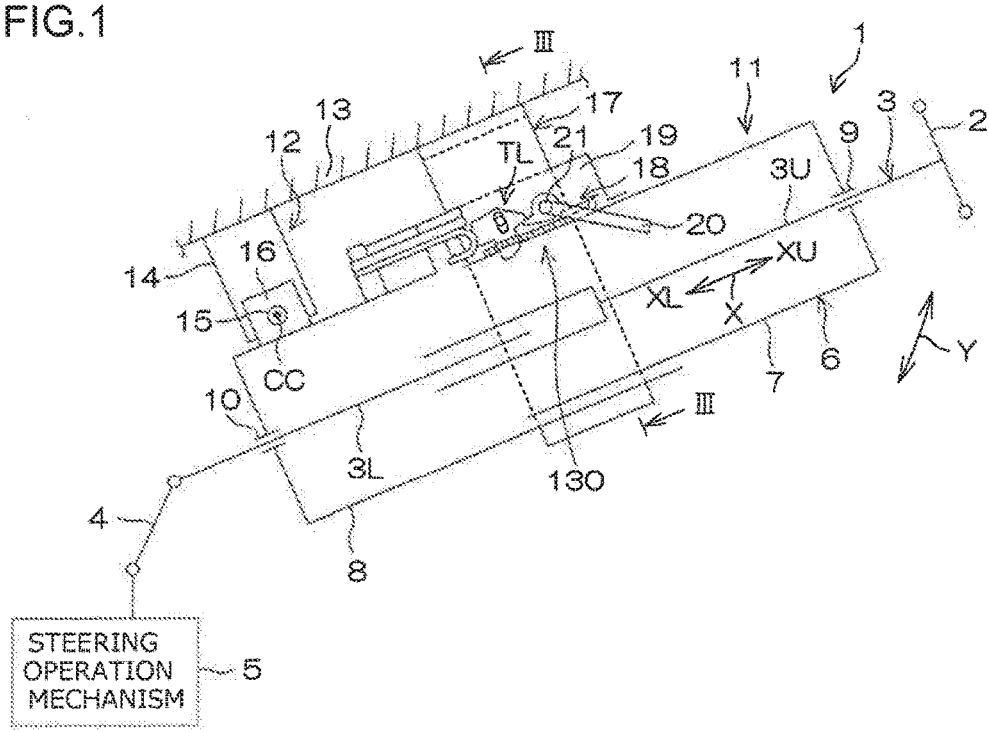
FIG. 1 is a schematic side view of a steering system according to an embodiment of the invention.

An embodiment of the present invention will be described below in detail. FIG. 1 is a schematic side view of a steering system 1 according to the embodiment of the present invention. As seen in FIG. 1, a steering system 1 includes a steering shaft 3, a column jacket 6, an intermediate shaft 4, and a steering operation mechanism 5. A steering member 2 such as a steering wheel is coupled to a first end (axially upper end) of the steering shaft 3. The steering system 1 steers steered wheels (not depicted in the drawings) in conjunction with steering of the steering member 2. The steering operation mechanism 5 is a rack-and-pinion mechanism but is not limited to the rack-and-pinion mechanism.

In the following description, an axially upper side XU refers to an upper side in a column axial direction X that is an axial direction of the steering shaft 3, and an axially lower side XL refers to a lower side in the column axial direction X. The steering shaft 3 has a tubular upper shaft 3U and a tubular lower shaft 3L. The upper shaft 3U and the lower shaft 3L are, for example, relatively movably fitted together by spline fitting or serration fitting. The steering member 2 is coupled to a first end of the upper shaft 3U located on the axially upper side XU.

The column jacket 6 includes a tubular upper jacket 7 and a lower jacket 8. The steering member 2 is connected to a first end of the upper jacket 7 via the upper shaft 3U. The lower jacket 8 is slidably fitted to a second end of the upper jacket 7. The lower jacket 8 is also an outer jacket. The upper jacket 7 is also an inner jacket internally fitted in the lower jacket 8. The column axial direction X is also an axial direction of the upper jacket 7 and an axial direction of the lower jacket 8. The axially upper side XU is also the first end side of the upper jacket 7. The axially lower side XL is also the second end side of the upper jacket 7.

The steering shaft 3 is inserted through the column jacket 6. The upper shaft 3U is rotatably supported by the upper jacket 7 via a bearing 9. The lower shaft 3L is rotatably supported by the lower jacket 8 via a bearing 10. The upper shaft 3U slides in the column axial direction X with respect to the lower shaft 3L. Consequently, the column jacket 6 can be extended and contracted in the column axial direction X along with the steering shaft 3.

The position of the steering member 2 can be adjusted in a front-rear direction of a vehicle by extending and contracting the steering shaft 3 and the column jacket 6 in the column axial direction X. Consequently, the steering system 1 has a telescopic adjustment function. The telescopic adjustment can be achieved by moving the upper jacket 7 within a predetermined telescopic stroke range. The telescopic stroke range is a range between a sliding lower limit position that is a sliding limit position on the second end side (lower end side) of the upper jacket 7 in the column axial direction X and a sliding upper limit position that is a sliding limit position on the first end side (upper end side) of the upper jacket 7 in the column axial direction X. The column jacket 6 is maximally contracted when the upper jacket 7 is at the sliding lower limit position and is maximally extended when the upper jacket 7 is at the sliding upper limit position. The sliding lower limit position is also referred to as a telescopic short position. The sliding upper limit position is also referred to as a telescopic long position.

The steering system 1 includes a fixed bracket 14, a tilt center shaft 15, and a column bracket 16. The fixed bracket 14 is fixed to a vehicle body 13. The tilt center shaft 15 is supported by the fixed bracket 14. The column bracket 16 is fixed to an outer periphery of the lower jacket 8 and rotatably supported by the tilt center shaft 15. The steering shaft 3 and the column jacket 6 can pivot in an up-down direction Y around a tilt center CC that is a central axis of the tilt center shaft 15.

The position of the steering member 2 can be adjusted in the up-down direction (height direction) by pivoting the steering shaft 3 and the column jacket 6 around the tilt center CC. Thus, the steering system 1 has a tilt adjustment mechanism. The steering system 1 includes a bracket 17 and a clamping mechanism 18. The bracket 17 is fixed to a vehicle body 13. The clamping mechanism 18 locks the positions of the shafts and jackets after tilt adjustment and telescopic adjustment. The clamping mechanism 18 achieves locking by clamping, via a bracket 17, a pair of clamped portions 19 integrally provided at an upper part of the lower jacket 8 in the column axial direction X.

Figure 2:
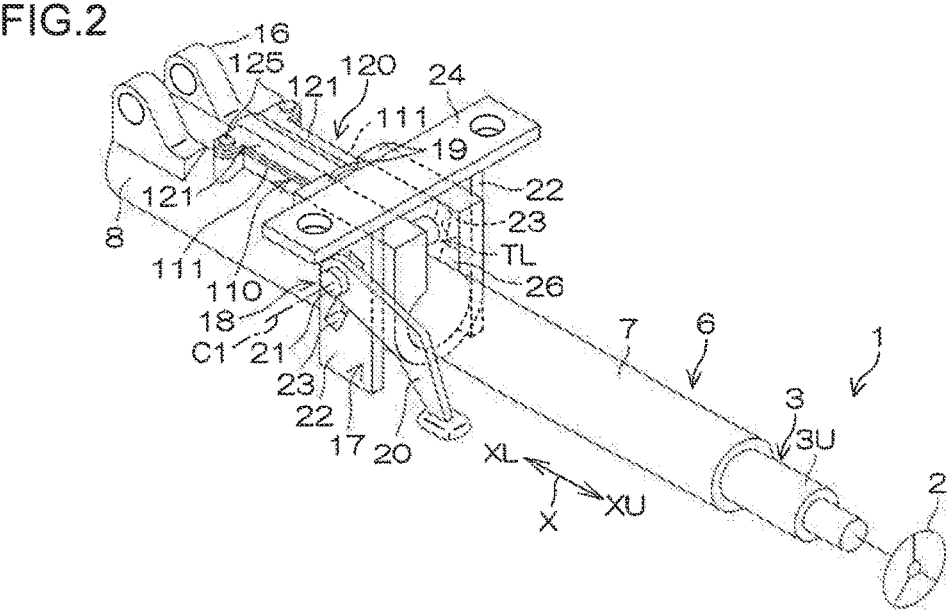
FIG. 2 is a schematic perspective view of the steering system.
Figure 3:
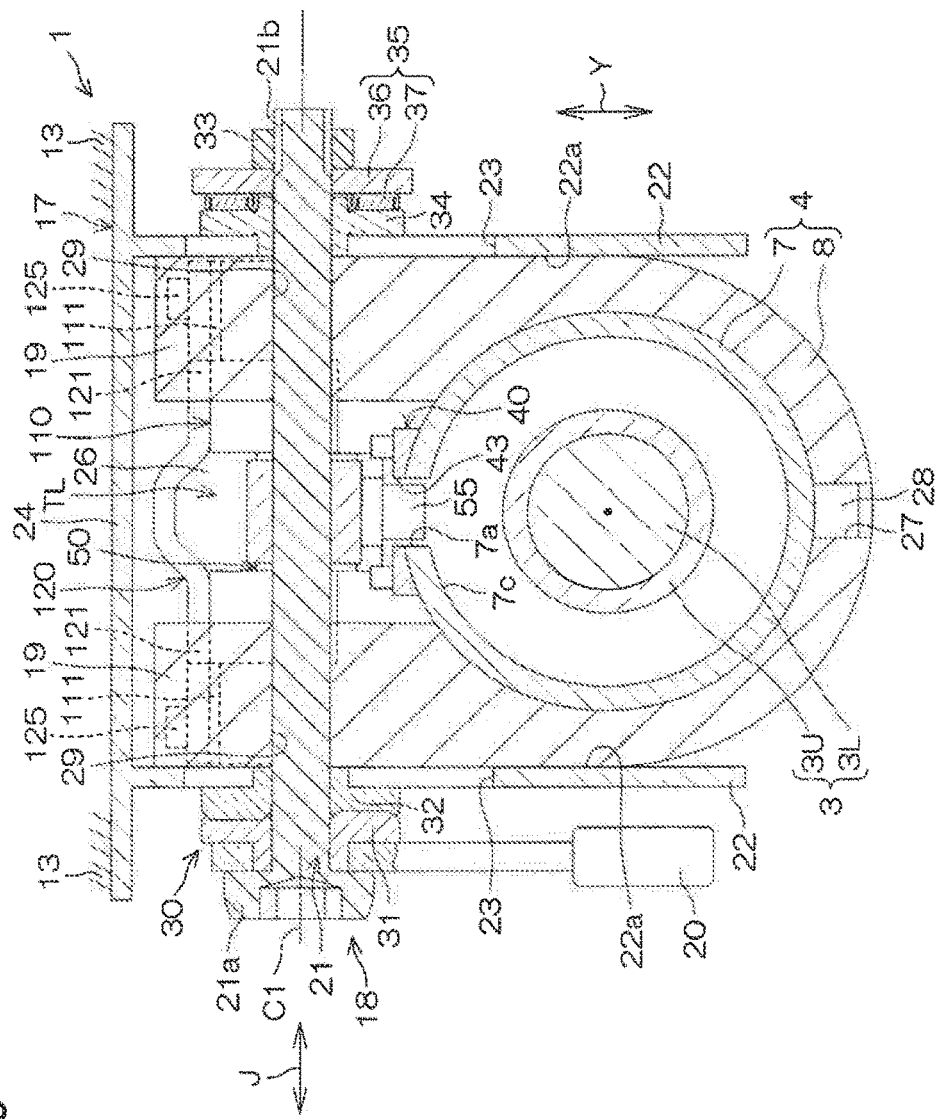
FIG. 3 is a schematic sectional view of the steering system and corresponds to a sectional view taken along line III-III in FIG. 1.

As depicted in FIG. 2 that is a schematic perspective view of the steering system 1, the lower jacket 8 includes a slit 26 extending toward the axially lower side XL from an upper end, in the column axial direction X, of the lower jacket 8. The clamped portions 19 are arranged at opposite ends of the slit 26. The diameter of the lower jacket 8 can be elastically reduced by clamping the clamped portions 19. FIG. 3 is a schematic sectional view of the steering system 1 taken along line III-III in FIG. 1.

As depicted in FIG. 3, the bracket 17 includes a mounting plate 24 and a pair of side plates 22. The mounting plate 24 is mounted to the vehicle body 13. The side plates 22 extend downward in the up-down direction Y from opposite ends of the mounting plate 24. A tilting slot 23 extending in the up-down direction Y is formed in each of the side plates 22.

The clamped portions 19 of the lower jacket 8 are arranged between the corresponding side plates 22 and each shaped like a plate extending along an inner side surface 22a of the corresponding side plate 22. A first insertion hole 29 that is a circular hole is formed in each of the clamped portions 19.

The lower jacket 8 forms a guide groove 27 extending in the column axial direction X. A guided protrusion 28 fixed to the upper jacket 7 is fitted in the guide groove 27. The guide groove 27 regulates rotation of the upper jacket 7 via the guided protrusion 28. During telescopic adjustment, an end (not depicted in the drawings) of the guide groove 27 located on the axially upper side XU comes into abutting contact with the guided protrusion 28. This regulates the upper jacket 7 to the sliding upper limit position of the telescopic stroke range. Consequently, the upper jacket 7 is also prevented from slipping out of the lower jacket 8.

As depicted in FIG. 1 and FIG. 2, the clamping mechanism 18 includes a clamping shaft 21 and an operation lever 20. The operation lever 20 is an operation member that allows the clamping shaft 21 to be rotationally operated. A central axis C1 of the clamping shaft 21 corresponds to a rotating center of the operation lever 20. The clamping shaft 21 is a bolt and is inserted through the tilting slots 23 in the side plates 22 of the bracket 17 and through the first insertion holes 29 in the clamped portions 19. During tilt adjustment, the clamping shaft 21 and the lower jacket 8 integrally move through the tilting slots 23 relative to the brackets 17.

A head 21a provided at a first end of the clamping shaft 21 is fixed to the operation lever 20 so as to be rotatable integrally with the operation lever 20. The clamping mechanism 18 further includes a force conversion mechanism 30. The force conversion mechanism 30 is interposed between the head 21a of the clamping shaft 21 and one of the side plates 22 (in FIG. 3, the left side plate 22) and converts an operation torque of the operation lever 20 of the clamping mechanism 18 into an axial force of the clamping shaft 21 (a clamping force allowing the side plates 22 to be clamped). The force conversion mechanism 30 includes a rotating cam 31 and a first clamping member 32. The rotating cam 31 is coupled to the operation lever 20 so as to be rotatable integrally with the operation lever 20, thus regulating movement of the rotating cam 31 in a clamping axial direction J in which the central axis C extends with respect to the clamping shaft 21. The first clamping member 32 cam-engages with the rotating cam 31 to clamp the corresponding side plate 22. The clamping member 32 is a rotationally regulated non-rotating cam.

The clamping mechanism 18 further includes a nut 33, a second clamping member 34, and an intervention member 35. The nut 33 is screwed to a threaded portion 21b formed at a second end of the clamping shaft 21. The second clamping member 34 clamps the corresponding side plate 22 (in FIG. 3, the right side plate 22). The intervention member 35 is interposed between the second clamping member 34 and the nut 33. The intervention member 35 includes a washer 36 and a needle roller bearing 37. The rotating cam 31, the first clamping member 32 (non-rotating cam), the second clamping member 34, and the intervention member 35 are supported by an outer periphery of the clamping shaft 21. The first clamping member 32 and the second clamping member 34 are fitted in the corresponding tilting slots 23 so that rotation of the first clamping member 32 and the second clamping member 34 is regulated.

When the rotating cam 31 rotates with respect to the clamping member 32 in conjunction with rotation of the operation lever 20 in a locking direction, the clamping member 32 moves away from the rotating cam 31 along the clamping axial direction J. Consequently, the clamping members 32, 34 clamp the side plates 22 of the bracket 17. At this time, the side plates 22 of the bracket 17 clamp the corresponding clamped portions 19 of the lower jacket 8. This regulates movement of the lower jacket 8 in the up-down direction Y to achieve tilt locking. The clamped portions 19 are clamped to elastically reduce the diameter of the lower jacket 8, thus clamping the upper jacket 7. As a result, movement of the upper jacket 7 in the column axial direction X is regulated to achieve telescopic locking.

On the other hand, when the operation lever 20 rotates in an unlocking direction, the rotating cam 31 rotates to move the clamping member 32 along the clamping axial direction J in a direction in which the clamping member 32 approaches the rotating cam 31. Consequently, clamping of the side plates 22 by the respective clamping members 32, 34 is released to enable tilt adjustment and telescopic adjustment. The steering system 1 further includes a tooth lock mechanism TL in order to stabilize initial restraint in a telescopic direction at the time of a secondary collision of a vehicle collision. The tooth lock mechanism TL is configured to mesh two sets of teeth with each other to hold a telescopic position of the upper jacket 7. Tooth locking refers to a state in which the telescopic position of the upper jacket 7 is held by meshing between the sets of teeth.

Figure 4:
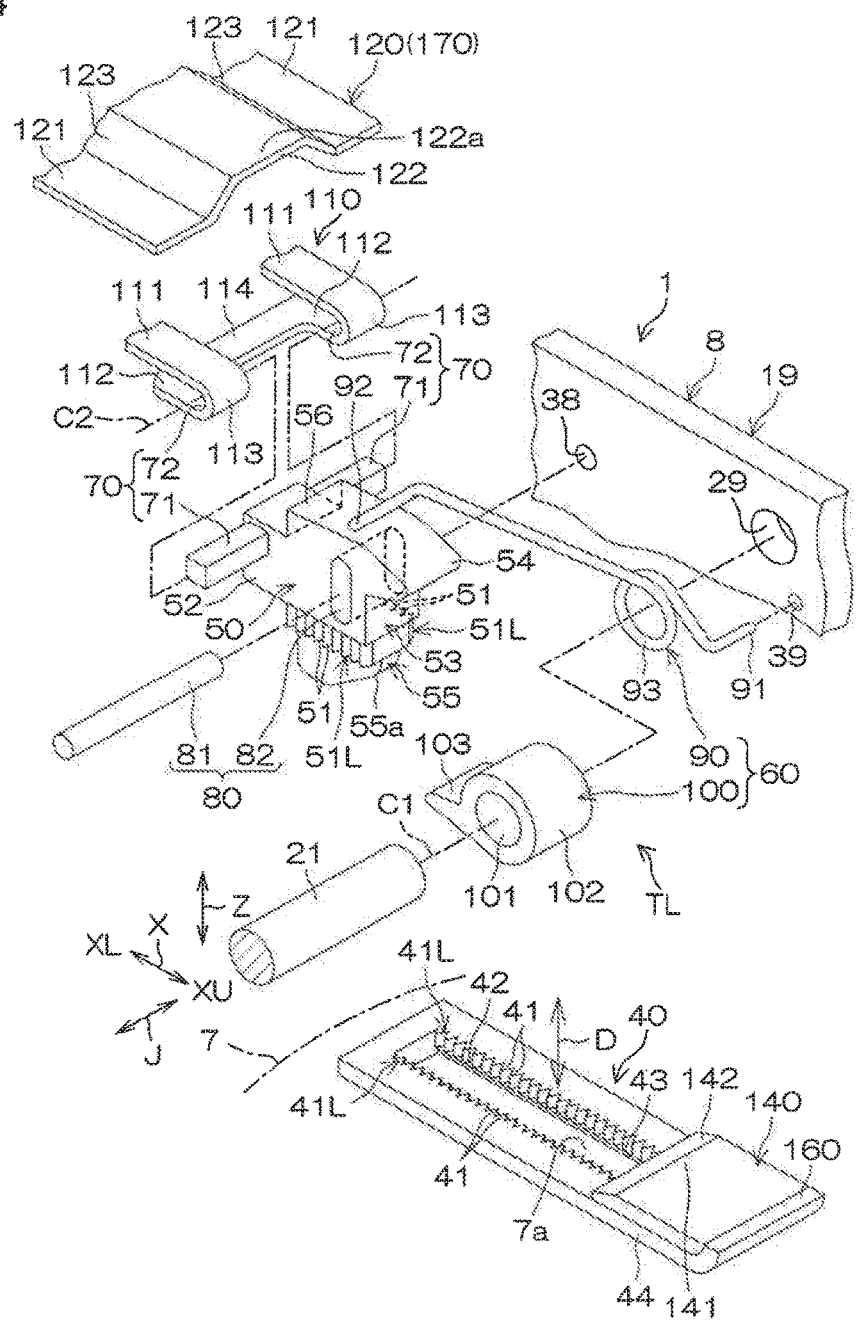
FIG. 4 is a schematic exploded perspective view of a tooth lock mechanism and a peripheral portion thereof.
Figure 5:
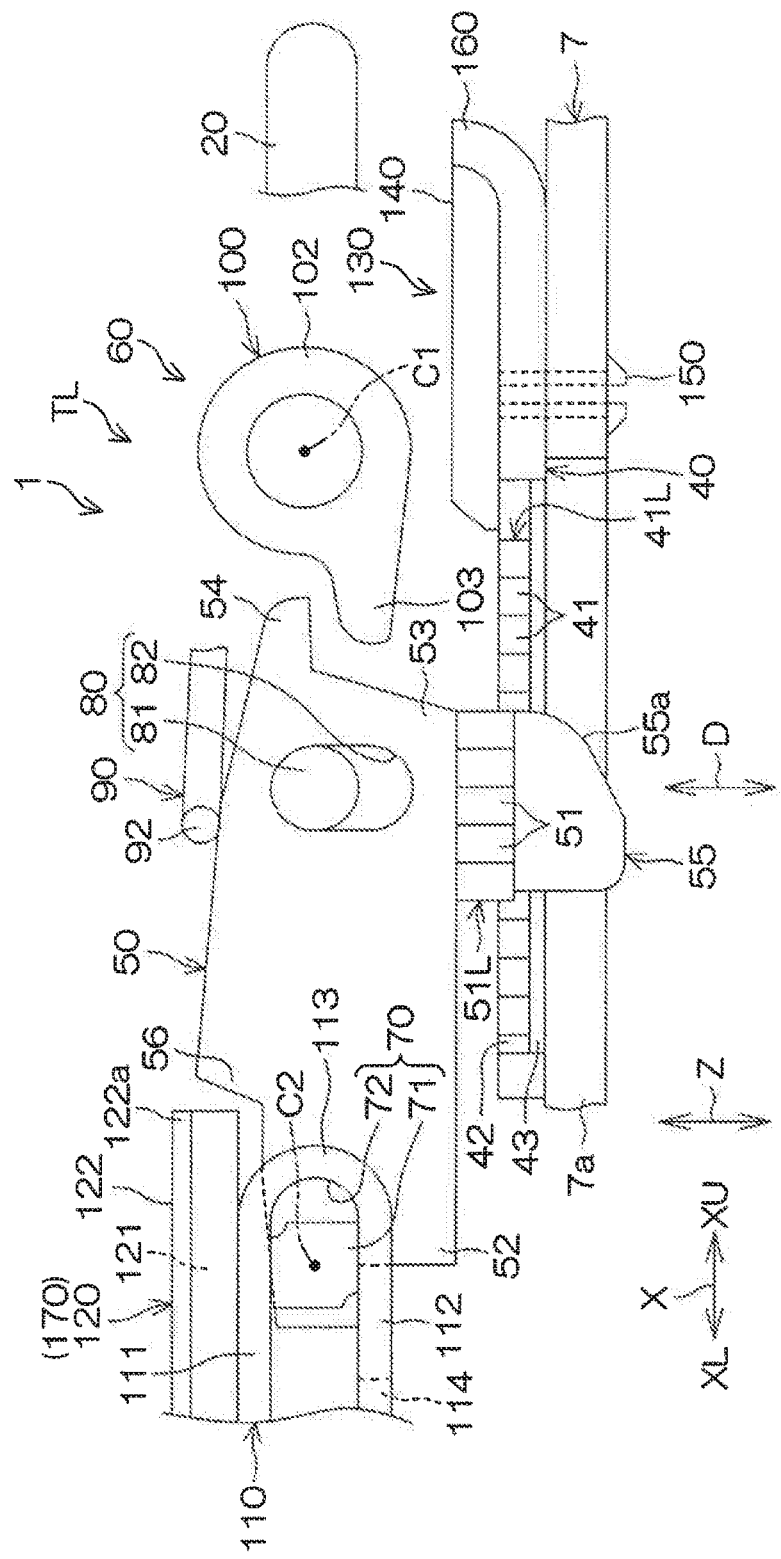
FIG. 5 is a schematic side view of the tooth lock mechanism, illustrating that first teeth are meshed with second teeth.
Figure 6:
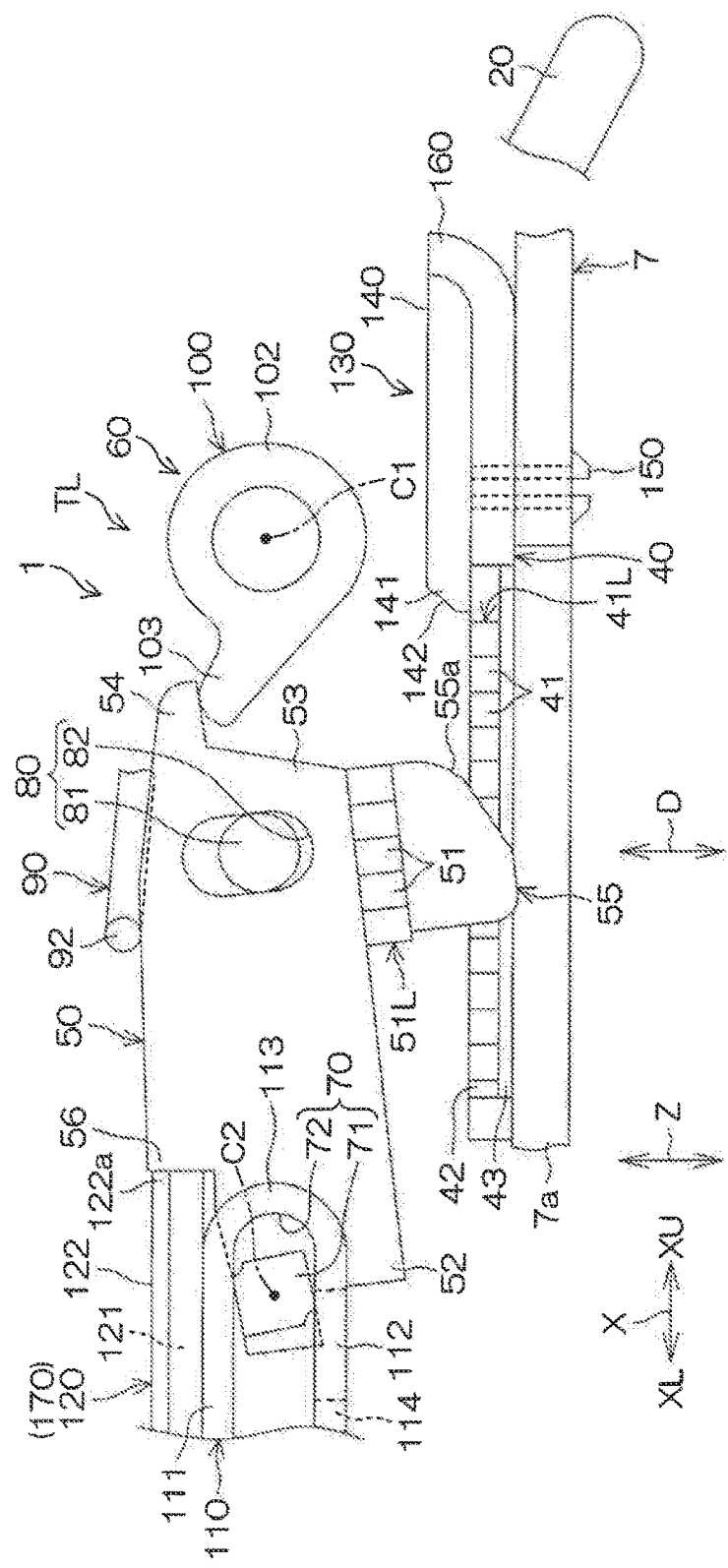
FIG. 6 is a schematic side view of the tooth lock mechanism, illustrating that the first teeth are unmeshed from the second teeth.

FIG. 4 is a schematic exploded perspective view of the tooth lock mechanism TL and a peripheral portion thereof. FIG. 5 is a schematic side view of the tooth lock mechanism TL illustrating that the sets of teeth are meshed with each other. FIG. 6 is a schematic side view of the tooth lock mechanism TL illustrating that the sets of teeth are unmeshed from each other.

As seen in FIG. 4 and FIG. 5, the tooth lock mechanism TL includes a first tooth member 40 and a second tooth member 50. The first tooth member 40 is fixed to the upper jacket 7 and includes a plurality of first teeth 41 arranged along the column axial direction X. The second tooth member 50 is rotatably supported by the lower jacket 8 and includes second teeth 51 that can mesh with the first teeth 41.

The first tooth member 40 is formed, for example, using a plate material extending in the column axial direction X and is fixed to an outer peripheral surface of the upper jacket 7 by welding or the like. Thus, the first tooth member 40 moves integrally with the upper jacket 7 during telescopic adjustment. Unlike in the present embodiment, the first tooth member 40 may be fixed to the upper jacket 7 with screws. A longitudinal groove 42 is formed in the first tooth member 40 in the column axial direction X.

The groove 42 has a pair of inner side surfaces extending in the column axial direction X and facing each other in the clamping axial direction J. A pair of first tooth rows 41L each including the first teeth 41 is formed in the first tooth member 40 such that each first tooth row 41L is formed on the corresponding inner side surface. In each of the first tooth rows 41L, the first teeth 41 are arranged in the column axial direction X. Tips of the first teeth 41 in one of the first tooth rows 41L face tips of the first teeth 41 in the other first tooth row 41L in the clamping axial direction J. A tooth trace direction D of the first teeth 41 is orthogonal both to the column axial direction X and to the clamping axial direction J. The tooth trace direction D is also a tooth width direction of the first teeth 41.

The second tooth member 50 includes a first portion 52 and a second portion 53. The first portion 52 is supported so as to rotate around a support. The second portion 53 is separated from the first portion 52, and the second teeth 51 are formed on the second portion 53. On a part of the second portion 53 of the second tooth member 50 that faces the first tooth member 40 in the tooth trace direction D, a pair of second tooth rows 51L is formed such that each of the second tooth rows 51L includes a plurality of the second teeth 51 arranged at regular intervals. Tips of the second teeth 51 in one of the second tooth rows 51L and tips of the second teeth 51 in the other of the second tooth rows 51L both face outward but in the opposite directions. The second teeth 51 in each second tooth row 51L can mesh with the first teeth 41 in the corresponding first tooth row 41L in the tooth trace direction D.

The steering system 1 further includes an impact absorbing member 110 and a guide member 120. At the time of a secondary collision of a vehicle collision, the impact absorbing member 110 is deformed to absorb an impact. The guide member 120 guides deformation of the impact absorbing member 110 at the time of the secondary collision. The impact absorbing member 110 includes a pair of first plate portions 111, a pair of second plate portions 112, and a coupling portion 114. Each of the first plate portions 111 is fixed to the lower jacket 8 at a first end of the first plate portion 111. Each of the first plate portions 111 is formed by folding back a corresponding one of the second plate portions 112 via a fold-back portion 113. The coupling portion 114 couples the second plate portions 112 together. Each of the first plate portions 111 of the impact absorbing member 110 is fixed to the lower jacket 8 at a first end of the first plate portion 111 with bolts 125 or the like as depicted in FIG. 2 and FIG. 3.

The guide member 120 includes a pair of first guide portions 121, a second guide portion 122, and a pair of connection portions 123. Each of the first plate portions 111 and the corresponding second plate portion 112 of the impact absorbing member 110 are arranged inward of the corresponding first guide portion 121 in a radial direction of the steering shaft 3. The second guide portion 122 is interposed between the first guide portions 121. The second guide portion 122 is connected to each first guide portion 121 via the corresponding connection portion 123. As depicted in FIG. 2, the guide member 120 is fixed to the lower jacket 8 by being fastened along with first ends of the first plate portions 111 using the bolts 125 or the like. Unlike in the present embodiment, the guide member 120 may be fixed directly to the lower jacket 8 by welding or the like or fixed to the lower jacket 8 via another member.

The tooth lock mechanism TL includes a first guide mechanism 70, a second guide mechanism 80, and an interlocking mechanism 60. The first guide mechanism 70 guides the first portion 52 of the second tooth member 50 in the column axial direction X. The second guide mechanism 80 guides the second portion 53 of the second tooth member 50 in an orthogonal direction Z that is orthogonal to the column axial direction X while the first teeth 41 are meshed with the second teeth 51. The interlocking mechanism 60 interlocks motion of the second tooth member 50 with rotation of the clamping shaft 21.

The first guide mechanism 70 includes a pair of first shafts 71 and a pair of first guide holes 72. The first shafts 71 both protrude outward but in the opposite directions from the first portion 52 of the second tooth member 50. Each of the first guide holes 72 is defined between the corresponding first plate portion 111 and the corresponding second plate portion 112 so as to extend toward the axially lower side XL. Through each of the first guide holes 72, the corresponding first shaft 71 is inserted. The first guide hole 72 supports the corresponding first shaft 71 such that the first shaft 71 is slidable in the column axial direction X. The first shaft 71 has a central axis C2 serving as a support for the second tooth member 50 (the support for the first portion 52). The second tooth member 50 is rotatably supported by the lower jacket 8 via the first shafts 71 and the first guide holes 72 in the impact absorbing member 110. Thus, the second tooth member 50 does not move integrally with the upper jacket 7 during telescopic adjustment. The first shafts 71, guided through the first guide holes 72, can move in the column axial direction X while kept parallel to the clamping shaft 21.

The second guide mechanism 80 includes a second shaft 81 and a second guide hole 82. The second shaft 81 is supported at opposite ends thereof by support holes 38 in the clamped portions 19 of the lower jacket 8. The second guide hole 82 is formed in the second tooth member 50, and the second shaft 81 is inserted through the second guide hole 82. The second guide hole 82 includes a slot extending in the orthogonal direction Z while the first teeth 41 are meshed with the second teeth 51. The interlocking mechanism 60 includes a bias member 90 and a releasing member 100. The bias member 90 biases the second tooth member 50 toward a meshing side (the side where the second teeth 51 mesh with the first teeth 41) so as to rotate around the central axis C2 of the first shafts 71. The releasing member 100 drives the second tooth member 50 toward an unmeshing side against the bias member 90.

The bias member 90 is a torsion spring including a first end 91, a second end 92, and a coil portion 93. The first end 91 is locked in a locking hole 39 serving as a locking portion for the clamped portion 19. The second end 92 is pressed against and engaged with the second portion 53 on a side of the second tooth member 50 opposite from the second teeth 51. The coil portion 93 is wound around the clamping shaft 21 between the first end 91 and the second end 92. The releasing member 100 includes an annular main body 102 and a releasing protrusion 103. The main body 102 has a fitting hole 101 in which the clamping shaft 21 is spline-fitted so as to be rotatable integrally with the main body 102. The releasing protrusion is a releasing portion protruding from an outer periphery of the main body 102.

Rotation of the clamping shaft 21 in the unlocking direction allows the releasing protrusion 103 to engage with an engaging protrusion 54 provided on the second portion 53 of the second tooth member 50. Consequently, the releasing protrusion 103 rotates the second tooth member 50 toward the unmeshing side against the bias member 90. In conjunction with the clamping mechanism 18, the tooth lock mechanism TL rotates the second teeth 51 toward the side where the second teeth 51 are meshed with the first teeth 41 and toward the side where the second teeth 51 are unmeshed from the first teeth 41.

When the operation lever 20 in an unlock position is rotated in the locking direction (in FIG. 6, counterclockwise), the releasing member 100 is rotated counterclockwise along with the clamping shaft 21 from the state illustrated in FIG. 6 to the state illustrated in FIG. 5. Consequently, the releasing protrusion 103 of the releasing member 100 disengages from the engaging protrusion 54 of the second tooth member 50. Thus, the bias member 90 rotatably drives the second tooth member 50 around the central axis C2 of the first shafts 71, which serves as a support for the second tooth member 50, and the second teeth 51 mesh with the first teeth 41 in the tooth trace direction D (see FIG. 5). This allows tooth locking to be achieved.

When a secondary collision of a vehicle collision occurs after tooth locking is achieved (after the first teeth 41 mesh with the second teeth 51), the second shaft 81 is sheared.

Consequently, the second tooth member 50 moves toward the axially lower side XL along with the upper jacket 7 and the first tooth member 40 while being guided by the second guide portion 122 of the guide member 120. At this time, the first portion 52 of the second tooth member 50 presses against and moves the coupling portion 114 of the impact absorbing member 110 toward the axially lower side XL. Thus, in the impact absorbing member 110, the first plate portions 111 and the second plate portions 112 are plastically deformed so as to move the fold-back portion 113 toward the axially lower side XL. This allows absorption of an impact resulting from a secondary collision.

Each of the first plate portions 111 and the corresponding second plate portion 112 of the impact absorbing member 110 are arranged inward of the corresponding first guide portion 121 in the radial direction of the steering shaft 3. Thus, the first guide portions 121 regulate outward deformation of the impact absorbing member 110 (particularly the first plate portions 111) in the radial direction of the steering shaft 3. On the other hand, when the operation lever 20 in the unlocked state is rotated in the unlocking direction (in FIG. 5, clockwise), the releasing member 100 is rotated clockwise along with the clamping shaft 21 from the state illustrated in FIG. 5 to the state illustrated in FIG. 6.

Consequently, the releasing protrusion 103 of the releasing member 100 pushes up the engaging protrusion 54 of the second tooth member 50. Thus, the second tooth member 50 is rotatably driven counterclockwise around the central axis C2 of the first shafts 71, which serves as a support for the second tooth member 50, and the second teeth 51 are unmeshed from the first teeth 41 by being separated from the first teeth 41 in the tooth trace direction D (see FIG. 6). This causes tooth locking to be released.

The steering system 1 further includes a lower-limit-position regulation mechanism 130 that regulates a sliding lower limit position of a telescopic stroke range. The lower-limit-position regulation mechanism 130 includes a damper 140 that comes into abutting contact with (into engagement with) the second tooth member 50 held by the lower jacket 8 to regulate the lower limit position of the upper jacket 7. The damper 140 is used as a stopper to absorb (buffer) an impact occurring at the time of abutting contact.

The lower-limit-position regulation mechanism 130 includes the damper 140, a locking member 150, and a reception member 160. The locking member 150 locks the damper 140 on the upper jacket 7. The reception member 160 lies on the axially upper side XU with respect to the damper 140 to receive the damper 140. The lower-limit-position regulation mechanism 130 further includes an abutting contact member 170 configured to inhibit the second tooth member 50 from being displaced toward the axially lower side XL while the first teeth 41 are unmeshed from the second teeth 51.

In the present embodiment, the abutting contact member 170 includes the above-described guide member 120 provided in association with the impact absorbing member 110. Specifically, the abutting contact member 170 includes an end 122a of the second guide portion 122 of the guide member 120 on the axially upper side XU. Since the guide member 120 is fixed to the lower jacket 8 with the bolts 125 or the like, the abutting contact member 170 is fixed to the lower jacket 8. Thus, the abutting contact member 170 does not move integrally with the upper jacket 7 during telescopic adjustment.

The lower-limit-position regulation mechanism 130 further includes a first abutting contact portion 55 and a second abutting contact portion 56. The first abutting contact portion 55 is provided on the second tooth member 50 and can come into abutting contact with the damper 140 when the first teeth 41 are unmeshed from the second teeth 51. The second abutting contact portion 56 is provided on the second tooth member 50 and can come into abutting contact with the abutting contact member 170 when the first teeth 41 are unmeshed from the second teeth 51. The first abutting contact portion 55 of the second tooth member 50 lies on the axially lower side XL with respect to the damper 140 so as to face the damper 140 while the first teeth 41 are unmeshed from the second teeth 51. The second abutting contact portion 56 of the second tooth member 50 lies on the axially upper side XU with respect to the end 122a of the second guide portion 122 of the guide member 120 so as to face the end 122a while the first teeth 41 are unmeshed from the second teeth 51.

The first abutting contact portion 55 has an inclined surface 55a inclined like a protruding curve so as to be gradually separated from the upper jacket 7 toward the axially upper side XU while the first teeth 41 are unmeshed from the second teeth 51. The inclined surface 55a may be inclined linearly or like a recessed curve so as to be gradually separated from the upper jacket 7 toward the axially upper side XU while the first teeth 41 are unmeshed from the second teeth 51. The first abutting contact portion 55 passes through a through-hole 43 formed in the first tooth member 40 and an insertion groove 7a formed in the upper jacket 7 such that the first abutting contact portion 55 is movable in the column axial direction X. The insertion groove 7a may be a through-hole as in the present embodiment or may be a groove that does not penetrate the upper jacket 7 unlike in the present embodiment.

Figure 7:
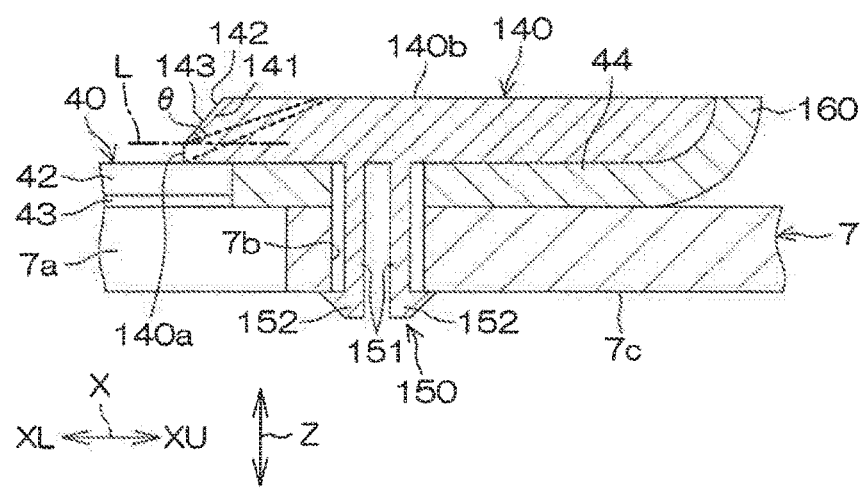
FIG. 7 is a schematic sectional view of a periphery of a damper.

FIG. 7 is a schematic sectional view of a periphery of the damper 140. As seen in FIG. 7, a damper arrangement portion 44 is fixed to the upper jacket 7 on the axially upper side XU with respect to the first teeth 41 of the first tooth member 40. The damper 140 is arranged on the damper arrangement portion 44 and fixed to the upper jacket 7 via the damper arrangement portion 44. Thus, the damper 140 moves integrally with the upper jacket 7 during telescopic adjustment. The damper 140 lies on the axially upper side XU with respect to the first abutting contact portion 55 of the second tooth member 50 so as to face the first abutting contact portion 55. Unlike in the present embodiment, the damper 140 may be fixed directly to the outer peripheral surface of the upper jacket 7 or to the upper jacket 7 via another member.

The damper 140 is formed of an elastic material such as rubber. The damper 140 is shaped generally like a rectangular parallelepiped. The damper 140 includes an inclined portion 142 located at a portion of the damper 140 that faces the first abutting contact portion 55 of the second tooth member 50, that is, located at an axially-lower-side XL end 141 of the damper 140, and the inclined portion 142 is tapered toward the axially lower side XL (see also FIG. 6). The inclined portion 142 has an inclined surface 143 that is linearly inclined so as to gradually approach the upper jacket 7 toward the axially lower side XL.

The inclined surface 143 is inclined at an angle θ of smaller than 90 degrees to a virtual plane L extending parallel to the column axial direction X and passing through an end of the inclined surface 143 located on the axially lower side XL. The angle θ is formed in the damper 140. The angle θ may be equal to or smaller than 45 degrees as depicted by a long dashed double-short dashed line. Unlike in the present embodiment, the inclined surface 143 may be inclined like a protruding or recessed curve so as to gradually approach the upper jacket 7 toward the axially lower side XL.

The inclined portion 142 is formed by chamfering (cutting away) a corner portion provided at an intersection of a first end face 140a on the axially lower side XL and a second end face 140b on the opposite side of the damper 140 from the upper jacket 7 in the orthogonal direction Z orthogonal to the column axial direction X. Unlike in the present embodiment, the inclined portion 142 may be formed by cutting away the entire first end face 140a of the inclined portion 142 as depicted by a dashed line.

The locking member 150 may be formed of an elastic body such as rubber. The locking member 150 is formed integrally with the damper 140 to be a single member. Unlike in the present embodiment, the locking member 150 may be formed using a material different from the material of the damper 140 and may be connected to the damper 140.

The locking member 150 includes the damper arrangement portion 44 of the first tooth member 40 and a pair of support portions 151. The support portions 151 are inserted through a through-hole 7b formed in a portion of the upper jacket 7, which faces the damper arrangement portion 44. The locking member 150 includes a pair of engaging portions 152 provided at tips of the corresponding support portions 151 and engaged with an inner peripheral surface 7c of the upper jacket 7. Each of the engaging portions 152 is provided on the corresponding support portion 151. The engaging portions 152 extend in an orthogonal direction orthogonal to a direction in which the support portions 151 extend.

A space is formed between the support portions 151 so as to allow the support portions 151 to be deflected in the space to make the engaging portions 152 closer to each other. Between each of the support portions 151 and an inner wall of the through-hole 7b, a space is formed in the column axial direction X. With the support portions 151 deflected so as to allow the engaging portions 152 to enter the through-hole 7b, the support portions 151 are inserted through the through-hole 7b until the engaging portions 152 reach an internal space in the upper jacket 7. The support portions 151 return to a state before deflection to engage the engaging portions 152 with the inner peripheral surface 7c of the upper jacket 7. Consequently, the damper 140 is locked on and thus fixed to the upper jacket 7.

The reception member 160 is fixed to the upper jacket 7. The reception member 160 is formed by bending an axially upper side XU portion of the damper arrangement portion 44 of the first tooth member 40 toward a side away from the upper jacket 7. The reception member 160 may be formed integrally with the first tooth member 40 or as a unitary member. The reception member 160 is in contact with an upper end of the damper 140 in the column axial direction X.

Figure 8:
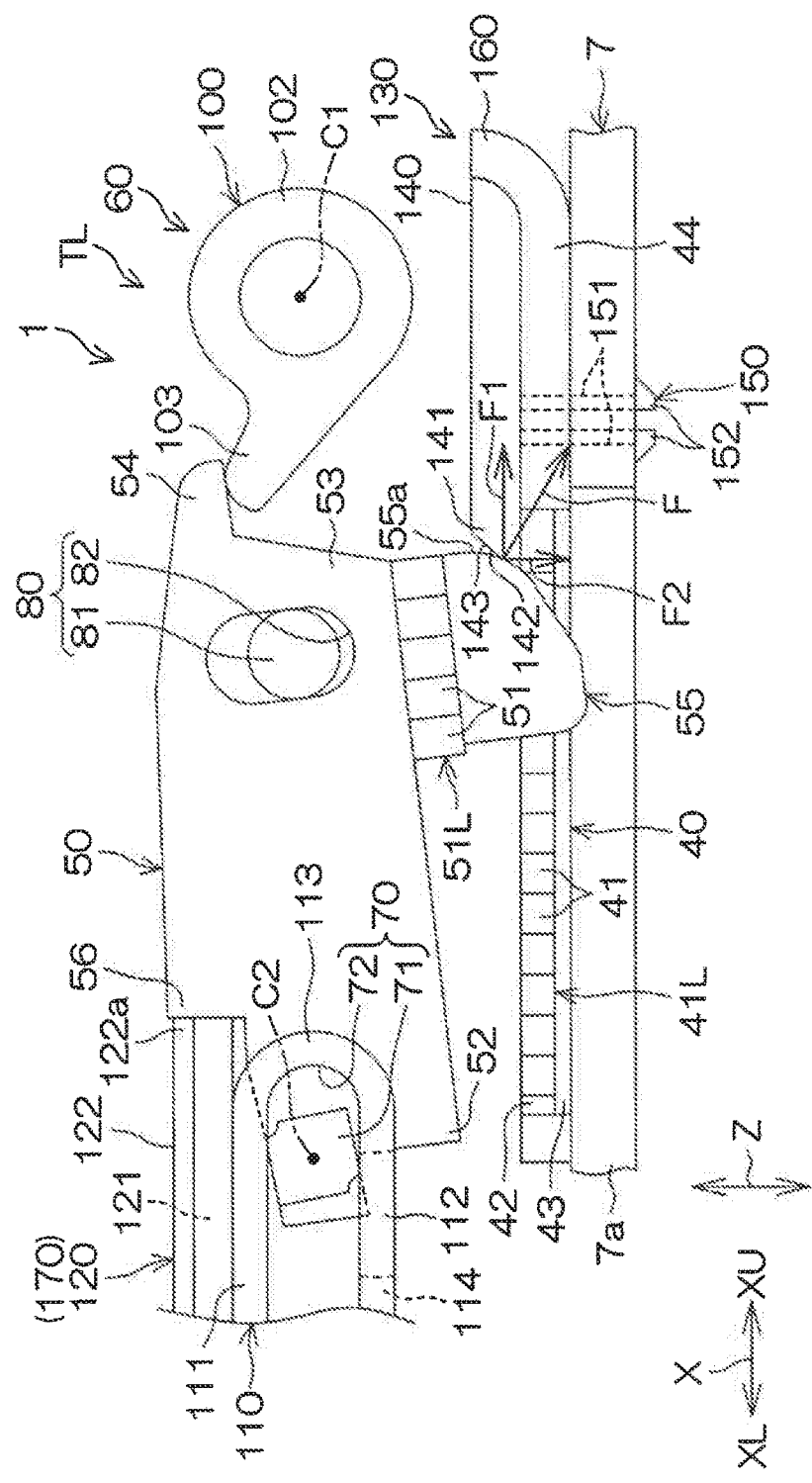
FIG. 8 is a diagram schematically illustrating that a second tooth member comes into abutting contact with the damper during telescopic adjustment.

FIG. 8 is a diagram schematically illustrating that the second tooth member 50 comes into abutting contact with the damper 140 during telescopic adjustment. When the operation lever 20 is rotated in the unlocking direction to disengage the second teeth 51 from the first teeth 41, the first tooth member 40 moves integrally with the upper jacket 7, whereas the second tooth member 50 and the end 122a of the guide member 120 (abutting contact member 170) do not move integrally with the upper jacket 7. When telescopic adjustment allows the upper jacket 7 to slide with respect to the lower jacket 8 and move to the sliding lower limit position, the first abutting contact portion 55 of the second tooth member 50, which lies on the axially lower side XL with respect to the inclined surface 143 of the damper 140 so as to face the inclined surface 143, comes into abutting contact with the inclined surface 143, resulting in an impact. At this time, since the abutting contact area of the damper 140 is the inclined surface 143, the direction of the impact input to the damper 140 as a result of the abutting contact with the first abutting contact portion 55 of the second tooth member 50 is orthogonal to the inclined surface 143. An abutting contact pressure F resulting from the abutting contact between the first abutting contact portion 55 of the second tooth member 50 and the inclined surface 143 can be decomposed into a partial force F1 in the column axial direction X and a partial force F2 in the orthogonal direction Z. When the first abutting contact portion 55 of the second tooth member 50 comes into abutting contact with the inclined surface 143, the end 122a of the second guide portion 122 (abutting contact member 170) of the guide member 120 comes into abutting contact with the second abutting contact portion 56 from the side opposite from the side where the damper 140 faces the second tooth member 50, that is, from the axially lower side XL.

That is, the second tooth member 50 functions as an engaging member that engages with the damper 140. The damper 140 functions as a damper member that buffers an impact resulting from abutting contact (engagement) between the damper 140 and the second tooth member 50. As described above, the second tooth member 50 can be allowed to function as the engaging member. In the present embodiment, the upper jacket 7 slides with respect to the lower jacket 8 to bring the second tooth member 50 supported by the lower jacket 8 into abutting contact with the damper 140 fixed to the upper jacket 7 so as to face the second tooth member 50, thus allowing an impact to be absorbed.

The damper 140 includes an inclined surface 143 that is located at an axially-lower-side XL end 141 of the damper 140 (the portion facing the second tooth member 50) and that is inclined so as to gradually be closer to the upper jacket 7 toward the second tooth member 50. Thus, the damper 140 is pressed against the upper jacket 7 upon coming into abutting contact with the second tooth member 50. Therefore, the damper 140 is restrained from being deflected or coming off from the upper jacket 7.

The abutting contact member 170 fixed to the lower jacket 8 comes into abutting contact with the second tooth member 50 from the axially lower side XL (the side opposite from the side where the damper 140 faces the second tooth member 50). Thus, a reaction force of the abutting contact pressure between the second tooth member 50 and the damper 140 is transmitted to the lower jacket 8 via the abutting contact member 170. Therefore, an impact resulting from the abutting contact between the damper 140 and the second tooth member 50 can be stably absorbed.

In the configuration in which the first teeth 41 can be meshed with and unmeshed from the second teeth 51, the damper 140 can be restrained from being deflected or coming off from the upper jacket 7 without increasing the number of components. Furthermore, an impact resulting from the abutting contact between the damper 140 and the second tooth member 50 can be stably absorbed. The abutting contact member 170 includes the guide member 120 fixed to the lower jacket 8 and provided in association with the impact absorbing member 110 that absorbs an impact at the time of a secondary collision. Thus, the abutting contact member 170 can stably receive the reaction force of the abutting contact pressure F exerted between the second tooth member 50 and the end 141 of the damper 140 while functioning as the guide member 120. Therefore, compared to a case where the abutting contact member 170 is provided separately from the guide member 120, the present embodiment enables a reduction in the number of components. An increase in the number of components is thus prevented, allowing the steering system 1 to be manufactured using an existing assembly line.

When the damper 140 receives the abutting contact pressure F, the partial force causes a friction force in the column axial direction X to be exerted between the damper 140 and the first tooth member 40 (particularly the damper arrangement portion 44). Thus, the friction force can be utilized to absorb a portion of an impact resulting from movement of the upper jacket 7 to the sliding lower limit position. If the damper 140 is arranged on the outer peripheral surface of the upper jacket 7 and fixed to the upper jacket 7 rather than being arranged on the damper arrangement portion 44 as in the present embodiment, the friction force is generated between the damper 140 and the upper jacket 7.

The damper 140 is locked on the upper jacket 7 via the locking member 150. Thus, the damper 140 can be more appropriately restrained from being deflected or coming off from the upper jacket 7 as a result of the abutting contact pressure F. Between each of the support portions 151 of the locking member 150 and the inner wall of the through-hole 7b, formed in the upper jacket 7 and the first tooth member 40, the space is formed in the column axial direction X. Thus, the locking member 150 can lock the damper 140 on the upper jacket 7 without hindering the damper 140 from being elastically deformed in the column axial direction X.

During telescopic adjustment, the second tooth member 50 is inhibited from being displaced toward the axially lower side XL. Thus, a possible load imposed on the second shaft 81 during telescopic adjustment can be kept low to suppress degradation of the second shaft 81. At the time of a secondary collision, as stable shearing load as possible can be imposed on the second shaft 81.

The invention is not limited to the above-described embodiment, and various changes may be made to the embodiment within the scope of claims. For example, in the present embodiment, the abutting contact member 170 includes the guide member 120. However, unlike in the present embodiment, the abutting contact member 170 may be provided, for example, on one of the clamped portions 19 of the lower jacket 8. In this case, the abutting contact member 170 includes a member (not depicted in the drawings) that protrudes from an inner side surface of one of the clamped portions 19 and that lies on the axially lower side XL with respect to the second abutting contact portion 56 so as to face the second abutting contact portion 56 while the first teeth 41 are unmeshed from the second teeth 51.

The damper 140 may be provided to regulate a sliding upper limit position instead of the sliding lower limit position. In this case, the damper 140 is preferably fixed to the upper jacket 7 on the axially lower side XL with respect to the first teeth 41 so as to face the second tooth member 50. Preferably, the abutting contact member 170, lying on the axially upper side XU with respect to the second tooth member 50, comes into abutting contact with the second tooth member 50.

The steering system 1 is not limited to the configuration with the tooth lock mechanism TL installed therein but may be configured to include, instead of the second tooth member 50, a member that comes into abutting contact with the damper 140. The steering system 1 is not limited to a manual type but may be an electric power steering system that assists steering by applying power of an electric motor to the steering shaft 3. In addition, various changes may be made to the invention within the scope of claims.

What is claimed is:

1. A steering system including a tubular upper jacket to which a steering member is connected at a first end of the upper jacket and a lower jacket slidably fitted to a second end of the upper jacket, the steering system enabling telescopic adjustment within a predetermined range, the steering system comprising:

an engaging member supported by the lower jacket;

a buffer member fixed to the upper jacket so as to face the engaging member; and an abutting contact member fixed to the lower jacket and coming into abutting contact with the engaging member from a side opposite from a side where the buffer member faces the engaging member, wherein the buffer member includes an inclined surface that is located at a portion of the buffer member, which faces the engaging member, and that is inclined so as to gradually be closer to the upper jacket toward the engaging member, and during telescopic adjustment, the engaging member comes into abutting contact with the inclined surface of the buffer member at a sliding limit position.

2. The steering system according to claim 1, further comprising:

a first tooth member fixed to the upper jacket and including a plurality of first teeth arranged along an axial direction of the upper jacket; and a second tooth member supported by the lower jacket so as to be able to pivot and including second teeth enabled to mesh with the first teeth, the second tooth member serving as the engaging member, wherein the buffer member is fixed to the upper jacket so as to lie closer to the first end or the second end than the first teeth, the abutting contact member comes into abutting contact with the second tooth member from a side opposite from a side where the buffer member faces the engaging member while the second teeth are unmeshed from the first teeth, and during telescopic adjustment, the second teeth of the second tooth member are unmeshed from the first teeth, and the second tooth member comes into abutting contact with an inclined surface of the buffer member at the sliding limit position.

3. The steering system according to claim 2, wherein the abutting contact member is fixed to the lower jacket and includes a guide member provided in association with an impact absorbing member that absorbs an impact made when a vehicle collision occurs.

4. The steering system according to claim 1, further comprising:

a locking member that locks the buffer member on the upper jacket.

5. The steering system according to claim 2, further comprising:

a locking member that locks the buffer member on the upper jacket.

6. The steering system according to claim 3, further comprising:

a locking member that locks the buffer member on the upper jacket.

* * * * *